United States Patent [19]

Harper et al.

[11] Patent Number: 4,637,860

[45] Date of Patent: Jan. 20, 1987

[54] BOARDS AND PANELS

[75] Inventors: Stephen Harper, London; David G. Hiscock, Slough, both of England

[73] Assignee: Cape Building Products Limited, Uxbridge, England

[21] Appl. No.: 644,160

[22] Filed: Aug. 27, 1984

Related U.S. Application Data

[63] Continuation of Ser. No. 389,389, Jun. 17, 1981, abandoned.

[30] Foreign Application Priority Data

Jun. 19, 1981 [GB] United Kingdom ................. 8118947

[51] Int. Cl.$^4$ .............................................. D21F 13/00
[52] U.S. Cl. ................................... 162/117; 162/145; 162/146; 162/177; 162/181.1; 162/181.6; 162/181.8; 264/82; 264/316; 264/333
[58] Field of Search ............... 162/116, 145, 152, 154, 162/156, 223, 117, 181.1, 181.6, 181.8, 177; 106/98, 99; 264/82, 333, 316

[56] References Cited

U.S. PATENT DOCUMENTS

| | | | |
|---|---|---|---|
| 1,433,864 | 10/1922 | Williams | 162/116 |
| 1,944,895 | 1/1934 | Ledeboer | 162/223 |
| 2,011,440 | 8/1935 | Dorn et al. | 162/116 |
| 3,645,961 | 2/1972 | Goldfein | 106/99 |
| 3,969,567 | 7/1976 | Occleshaw et al. | 106/99 |
| 4,132,555 | 1/1979 | Barrable | 106/99 |
| 4,363,666 | 12/1982 | Johnson et al. | 106/99 |

*Primary Examiner*—Peter Chin
*Attorney, Agent, or Firm*—Frost & Jacobs

[57] ABSTRACT

A process for the manufacture of a non-asbestos corrugated sheet comprising forming into corrugated form an aqueous slurry of a mixture comprising, on a dry weight basis, 40–60% cement, 30–40% silica and 5–15% cellulose fibres, compressing said corrugated form so produced in a press to reduce its thickness and increase its density, removing said form from said press and submitting said form to autoclaving to cause reaction to occur between said cement and said silica to form a binder matrix. The aqueous slurry may include a moldability aid such as finely divided silica, and the corrugated forms are suitably compressed individually and then passed through a steam tunnel partially to harden them before autoclaving. In corrugated sheets formed are suitable for external cladding and roofing.

17 Claims, No Drawings

BOARDS AND PANELS

This application is a continuation of application Ser. No. 389,389, filed 6-17-81, abandoned.

This invention relates to corrugated sheets and especially to such sheets which are for use in the building industry, for example for cladding and roofing. The invention is also concerned with the manufacture of corrugated sheets, and with compositions for use in such manufacture.

Of all the materials which are known and available for roofing and cladding, asbestos reinforced corrugated cement sheets and boards are among the best, since they possess good strength and their weathering characteristics give them a long life. A basic disadvantage of asbestos-cement sheets is the fact that they contain asbestos, a fibrous material the dust of which is thought to constitute a health hazard, and the industry is therefore constantly seeking alternatives to this material.

No single material has been found with characteristics which satisfactorily match all those of asbestos, and it has thus been proposed to use mixtures of materials, e.g. mixtures of fibrous materials such as cellulose and glass fibres, and mixtures of cellulose fibres with mica or vermiculite. Where fire resistance is not so important cellulose fibres have been used alone to replace asbestos and sheets for building purposes have been made from compositions of cellulosic fibres and cement.

Such cellulose-cement materials possess useful properties, but they are not suitable for outside use since their weathering and freeze-thaw resistance is unsatisfactory and their long term strength is insufficient to meet the required wind loading specifications.

We have found that improved properties in these respects can be achieved by stabilising the cement binder matrix by autoclaving it with silica. The consequence of adding silica however is that the density of the formed sheet is reduced below the level necessary to achieve sufficient strength and freeze-thaw resistance. It is therefore necessary to increase the density of the green sheet before autoclaving. Incorporation of silica also reduces the moldability of the flat green sheet, making moldability to the batch mixture necessary to overcome this problem.

It is the object of the invention to provide a process and a composition for manufacturing non-asbestos corrugated sheets which possess the high strength and durability necessary to permit their satisfactory use as external materials, e.g. as roofing and cladding sheets.

According to the invention a process for the manufacture of a non-asbestos corrugated sheet comprises forming into corrugated form an aqueous slurry of a mixture comprising, on a dry weight basis, 40–60% cement, 30–40% silica and 5–15% cellulose fibres, compressing said corrugated form so produced in a press to reduce its thickness and increase its density, removing said form from said press and submitting said form to autoclaving to cause reaction to occur between said cement and said silica to form a binder matrix.

In one process aspect the aqueous slurry is formed into flat sheet shape while removing water therefrom, and is subsequently shaped into corrugated form. In another process aspect the aqueous slurry is formed directly into corrugated form, e.g. by flowing it onto a corrugated former.

The cement will suitably be a hydraulic cement and preferably it is Ordinary Portland Cement. The silica will preferably have a specific surface area (Rigden) in excess of 200 m$^2$/Kg, suitably up to 1500 m$^2$/Kg, e.g. in the range 200 to 500 m$^2$/Kg, and preferably it will be in the form of ground quartz. The cement will preferably be present in the initial aqueous slurry in an amount of 50 to 55%, on a dry weight basis; the silica will preferably be present in an amount of 35 to 40%, on a dry weight basis.

The cellulose fibres may suitably comprise woodpulp, cotton or flax and are suitably present in the initial batch in an amount of 7–12%, by weight on a dry solids basis. The cellulose fibres are preferably processed to a freeness within the range 18° to 35°S.R.

The aqueous slurry used to form the corrugated sheets of this invention may also include other fibrous reinforcing materials, both organic and inorganic; examples include polyamide fibres (e.g. "Nylon" and "Kevlar") fibres, which may suitably be used in amounts of 0.05 to 1.0% by weight, based on the solids content of the slurry, and glass and rock fibres, which may suitably be used in amounts up to 20% by weight, on the same basis.

It is greatly preferred that the plasticity of the green sheet should be improved by incorporating in it, preferably at the batch mixing stage, a moldability aid. These aids should increase the plasticity of the green sheet without significantly increasing its moisture content. This prevents the formation of fine cracks and fissures which might otherwise occur at the shaping and compression stages. Suitable moldability aids include certain fine silicas having a specific surface area (Rigden) greater than 1000 m$^2$/Kg and which may be used as a partial or complete replacement for the ground quartz; clay e.g. bentonite, ball clay or china clay which may be present in amounts up to 15% by weight based on the initial dry batch mix; carboxy methyl cellulose and plasticisers and super plasticisers as used in the making of concrete; and mixtures of any two or more of these.

The initial batch also preferably includes a flocculating agent, to assist retention of the slurry solids during sheeting out.

The sheets of the invention are suitably manufactured using one of the machines well known in the asbestos-cement sheet manufacturing industry, e.g. Hatschek, Magnani and Fourdrinier machines.

A typical manufacturing procedure involves the following sequence of operations.

(1) The cellulose fibres e.g. of woodpulp, cotton, flax, are processed by pulping, beating and refining, e.g. to a freeness of 18° to 35°S.R.

(2) The other ingredients of the batch i.e. cement, silica, other fibres, and moldability aids and flocculating agents where appropriate are mixed with the processed cellulose pulp to produce an aqueous slurry.

(3) The slurry is taken up on the moving permeable felt of a Hatschek machine and forms a thin film of damp composition thereon which is transferred to a rotating drum on which the mixture builds up.

(4) When a desired thickness of mixture has built up on the drum it is removed in the form of a flat sheet, of length e.g. 1 to 5 meters.

(5) The flat sheet is formed into a corrugated shape.

(6) The corrugated sheet is placed in a press and its thickness reduced. The press may be of the same type as is used in the production of high density corrugated asbestos cement sheet, and the pressure exerted is preferably sufficient to give the final sheet product a dry density of at least 1400 Kg/m³. The individual compressed sheets are placed in stacks separated by profiled molds.

(7) The stack of compressed sheets can then be passed through a steam tunnel to harden them sufficiently to enable them to be stripped from the stack.

(8) The sheets are stripped from the stack to separate them from the profiled molds and are then autoclaved to complete the cement-silica reaction.

In another procedure, using a Magnani machine instead of a Hatschek machine, steps (3) to (5) above are replaced by the single step of flowing the aqueous slurry onto a stationary permeable corrugated former, whereby the slurry is directly shaped into corrugated form.

The following Examples are given to illustrate the invention.

EXAMPLE 1

| Composition | % by weight |
|---|---|
| Woodpulp, semibleached kraft Freeness 22° SR | 10.5 |
| Ordinary Portland Cement | 50.0 |
| Ground Quartz SSA (Rigden) 330 m²/Kg | 39.5 |

This composition was run on a Hatschek machine using a flocculant and corrugated sheets were produced. Some were pressed before curing and autoclaving and the remainder was autoclaved in unpressed form. Samples were cut from the corrugated sheets and after soaking in water at room temperature they were tested as described below ("MR" means Modulus of Rupture).

| "Standard Six" Corrugated Sheets These were tested using the method described in BS4624. | | |
|---|---|---|
| Unpressed | MR Across grain | 13.9 N/mm² |
| | Density | 1183 Kg/m³ |
| Pressed | MR Across grain | 16.5 N/mm² |
| | Density | 1413 Kg/m³ |

EXAMPLE 2

| Composition | % by weight |
|---|---|
| Woodpulp - bleached softwood Freeness 19° SR | 9.5 |
| Ordinary Portland Cement | 55.1 |
| Ground Quartz SSA (Rigden) 500 m²/Kg | 25.4 |
| Silica SSA (BET) 20,000 m²/Kg | 10.0 |

This composition had improved molding properties compared to the mix in Example 1 and was used to produce corrugated sheets in the manner described in Example 1.

EXAMPLE 3

| Composition | % by weight |
|---|---|
| Cotton (chemically processed semi-bleached) 25° SR | 9 |
| Ordinary Portland Cement | 52 |
| Ground Quartz SSA (Rigden) 330 m²/Kg | 38 |
| Bentonite (Wyoming) | 5 |

The bentonite was pre-gelled by making a 5% aqueous slurry, stirring it for an hour, leaving it to stand overnight and again stirring for 1 hour. It was added to the processed cotton along with the silica and cement.

This mix had very good molding characteristics when run on the Hatschek and corrugated into profiled sheets. The sheets were pressed after manufacture and after curing and autoclaving these were tested as described in Example 1.

| "Standard Six Sheets" | | |
|---|---|---|
| Unpressed | MR Across grain | 13.6 N/mm² |
| | Density | 1129 Kg/m³ |
| Pressed | MR Across grain | 18.0 N/mm² |
| | Density | 1545 Kg/m³ |

EXAMPLE 4

| Composition | % by weight |
|---|---|
| Woodpulp - semi-bleached softwood - Freeness 21° SR | 10 |
| Cement, Ordinary Portland | 52 |
| Quartz SSA (Rigden) 450 m²/Kg | 38 |

Melment, a commercially available superplasticiser, was added at the rate of 2% on the weight of cement. It was added to the mix immediately after the cement was fed into the cellulose slurry. The wet flat produced was much more moldable than that manufactured in Example 1. The wet flat was more plastic but without any increase in moisture content or loss of wet tensile strength. Sheets were corrugated and some were pressed. Both pressed and unpressed sheets were autoclaved and tested as described in Example 1.

| Unpressed "Standard Six" Sheets | |
|---|---|
| MR Across grain | 10.1 N/mm² |
| Density | 1137 Kg/m³ |
| Pressed "Standard Six" Sheet | |
| MR Across grain | 16.2 N/mm² |
| Density | 1510 Kg/m³ |

By means of the present invention it is possible for the first time to produce a fibre-reinforced corrugated cement-based sheet suitable for external building purposes which contains no asbestos but nevertheless meets the performance requirements for asbestos-cement sheets. Cellulose-containing corrugated cement sheets have been produced before, but they have not shown the required performance characteristics. That the corrugated sheets of the invention succeed where the hitherto available sheets do not, is believed to be due to the unique combination of the steps of compressing the formed corrugated shape to reduce its thickness, followed by autoclaving. The corrugated sheets may be made in a wide range of profiles, and in lengths greater than the previously manufactured sheets referred to above.

What is claimed is:

1. A process for the manufacture of a non-asbestos corrugated sheet for external use from a mixture comprising, on a dry weight basis, 40-60% cement, 30-40% silica and 5-15% cellulose fibers, comprising the following steps:

(1) processing the cellulose fibers to a freeness of 18°–35° S.R.;
(2) mixing the cellulose fibers with the cement and silica in a flocculating agent to produce an aqueous slurry;
(3) taking up the slurry on the moving permeable belt of a Hatschek machine to form a film of damp composition thereon and transferring said film to a rotating drum on which the mixture builds up;
(4) removing a desired thickness of mixture from the drum in the form of a flat sheet;
(5) forming said flat sheet into a corrugated shape;
(6) placing said corrugated sheet in the press and reducing its thickness therein; and
(7) subjecting the pressed corrugated sheet to an autoclaving reaction to cause reaction to occur between said cement and said silica to form a binder matrix.

2. A process as claimed in claim 1, wherein the cement is ordinary Portland Cement.

3. A process as claimed in claim 1, wherein the cement is present in the aqueous slurry in an amount of 50–55%, on a dry weight basis.

4. A process as claimed in claim 1, wherein the silica has a specific surface area (Rigden) in excess of 200 m$^2$/kg.

5. A process as claimed in claim 1, wherein the silica is in the form of ground quartz.

6. A process as claimed in claim 1, wherein the silica is present in the aqueous slurry in an amount of 35 to 40%, on a dry weight basis.

7. A process as claimed in claim 1, wherein the aqueous slurry comprises 7–12% cellulose fibers, by weight, on a dry solids basis.

8. A process as claimed in claim 1, wherein the cellulose fibers comprise wood pulp, cotton or flax.

9. A process as claimed in claim 1, wherein the aqueous slurry comprises other reinforcing fibers in addition to the cellulose fibers.

10. A process as claimed in claim 9, wherein the other reinforcing fibers include polyamide fibers in an amount of 0.5 to 1.0% by weight, based on the solids content of the slurry.

11. A process as claimed in claim 9, wherein the said other reinforcing fibers include glass and/or rock fibers in an amount of up to 20% by weight, based on the solids content of the slurry.

12. A process as claimed in claim 1, wherein the aqueous slurry contains a moldability aid.

13. A process as claimed in claim 12, wherein the moldability aid comprises a silica having a specific surface area (Rigden) greater than 1000 m$^2$/kg.

14. A process as claimed in claim 13, wherein said moldability aid comprises bentonite, ball clay, china clay, carboxymethyl cellulose, or a plasticizer or superplasticizer.

15. A process as claimed in claim 1, wherein, following step (VI), but before step (VII), the pressed corrugated sheet is passed through a steam tunnel to harden it sufficiently for it to be self-supporting.

16. A process as claimed in claim 1, wherein, following step (VI), but before step (VII), a plurality of individually pressed corrugated sheets are placed in a stack in which they are separated by profiled molds, and said stack is passed through a steam tunnel to harden said corrugated sheet sufficiently to enable them to be stripped from the stack.

17. A non-asbestos corrugated sheet manufactured in accordance with the process claimed in claim 1.

* * * * *